(12) United States Patent
Krüger et al.

(10) Patent No.: US 7,913,455 B2
(45) Date of Patent: Mar. 29, 2011

(54) PLASTIC DOOR MODULE FOR A MOTOR VEHICLE DOOR

(75) Inventors: Harald Krüger, Erlangen (DE); Manfred Stenzel, Bamberg (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 256 days.

(21) Appl. No.: 11/520,495

(22) Filed: Sep. 12, 2006

(65) Prior Publication Data

US 2007/0062123 A1  Mar. 22, 2007

(30) Foreign Application Priority Data

Sep. 12, 2005 (DE) .................... 20 2005 014 607 U
Aug. 2, 2006 (DE) ........................ 10 2006 037 157

(51) Int. Cl.
B60J 5/04 (2006.01)
(52) U.S. Cl. .......................................... 49/502; 296/152
(58) Field of Classification Search ................ 49/502, 49/348; 296/146.1, 146.7, 152
See application file for complete search history.

(56) References Cited

U.S. PATENT DOCUMENTS

| | | | |
|---|---|---|---|
| 5,584,144 A * | 12/1996 | Hisano | 49/502 |
| 5,927,020 A * | 7/1999 | Kobrehel | 49/502 |
| 5,931,682 A * | 8/1999 | Takiguchi et al. | 439/34 |
| 5,937,584 A * | 8/1999 | Salmonowicz et al. | 49/502 |
| 6,226,927 B1 * | 5/2001 | Bertolini et al. | 49/502 |
| 6,301,835 B1 * | 10/2001 | Pfeiffer et al. | 49/502 |
| 6,367,202 B1 * | 4/2002 | Reed et al. | 49/502 |
| 6,892,496 B1 * | 5/2005 | Youngs et al. | 49/506 |
| 7,059,658 B2 * | 6/2006 | Ziegler et al. | 296/146.7 |
| 2001/0017476 A1 * | 8/2001 | Nishikawa et al. | 296/146.6 |
| 2001/0037607 A1 * | 11/2001 | Pfeiffer et al. | 49/502 |
| 2002/0095870 A1 * | 7/2002 | Praud et al. | 49/502 |
| 2002/0170235 A1 * | 11/2002 | Petroski et al. | 49/502 |
| 2003/0097798 A1 * | 5/2003 | Staser | 49/502 |
| 2006/0101720 A1 * | 5/2006 | Zimmerman et al. | 49/502 |
| 2007/0017159 A1 * | 1/2007 | Moore | 49/502 |
| 2007/0024082 A1 * | 2/2007 | Steelman | 296/146.1 |
| 2007/0056219 A1 * | 3/2007 | Martinez et al. | 49/502 |
| 2007/0107315 A1 * | 5/2007 | Koellner et al. | 49/502 |
| 2008/0022602 A1 * | 1/2008 | Senoo | 49/502 |
| 2008/0148647 A1 * | 6/2008 | Pavlovic | 49/502 |
| 2008/0276541 A1 * | 11/2008 | Roy et al. | 49/502 |

FOREIGN PATENT DOCUMENTS

| | | |
|---|---|---|
| DE | 692 15 103 T2 | 2/1994 |
| DE | 102 30 073 A1 | 1/2004 |
| DE | 102 59 630 A1 | 7/2004 |
| EP | 0 606 238 B1 | 7/1994 |

* cited by examiner

Primary Examiner — Katherine Mitchell
Assistant Examiner — Catherine A Kelly
(74) Attorney, Agent, or Firm — Christie, Parker & Hale, LLP

(57) ABSTRACT

A plastic door module for a motor vehicle door includes interfaces for connecting or receiving functional elements of a motor vehicle door, such as window lifter rail and a speaker. The interface for connecting the window lifter rail is connected to the interface for receiving the speaker.

30 Claims, 8 Drawing Sheets

PLASTIC DOOR MODULE FOR A MOTOR VEHICLE DOOR

CROSS-REFERENCE TO A RELATED APPLICATION(S)

This application claim priority to and the benefit of German Utility Model Application No. 20 2005 014 607.2, filed on Sep. 12, 2005, and German Patent Application No. 10 2006 037 157.7, filed on Aug. 2, 2006, which are hereby incorporated by reference

BACKGROUND

The invention relates to a plastic door module for a motor vehicle door.

DE 102 30 073 A1 discloses a motor vehicle door with a window which is movable therein and with two window lifter rails for guiding the window and a plastic module carrier, which is fitted in the interior space of the motor vehicle door, for receiving functional elements of the motor vehicle door, such as speakers or the like. In order to ensure that the window lifter rails take up a position with respect to the module carrier which is unambiguously defined and is independent of additional frictional connection elements, the module carrier and/or the window lifter rails has/have an upper fastening point which is provided in the vicinity of the door breastwork and is integrated in the surface structure of the module carrier on the wet space side of the module carrier, which side faces away from the vehicle interior. The lower fastening points of the window lifter rails are arranged in the vicinity of the door base, the front guide rail being arranged such that it runs adjacent to the front side edge of the motor vehicle door behind the speaker, and the rear guide rail being arranged such that it runs with identical connections parallel to the front guide rail in the vicinity of the rear side edge of the motor vehicle door.

The window lifter rails are screwed on the wet space side, which faces away from the vehicle interior, via a screw to the module carrier which has a bag-like receptacle which is composed of plastic and is connected to the rest of the module carrier by a reinforcing strut while the window lifter rail has a hole-like receptacle into which a cylindrical pin is fitted in a form-fitting manner.

Although, by means of the form-fitting receiving of the window lifter rails, the known module carrier permits an unambiguous assignment of the window lifter rails to the module carrier and the supporting of the weight of the window lifter rails and of the window supported by them without the necessity of fastening the window lifter rails to elements of the inside door panel of the motor vehicle door, it requires a large construction depth and a contact surface for the connection of the window lifter rails, which contact surface cannot be used for other functional elements of the motor vehicle door or for the integration of a map holder rear wall for an inside door lining covering the module carrier with respect to the vehicle interior.

SUMMARY

It is the object of the present invention to provide a plastic door module for a motor vehicle door, the interface of which for connecting at least one window lifter rail permits optimum utilization of the construction use while ensuring a construction appropriate for the load.

The connection of the interface for connecting the contact surface of the window lifter rail to the interface of the plastic door module for receiving the speaker makes use of the interface for receiving the speaker, which interface is stiff for acoustic reasons, and at the same time obtains optimum utilization of the construction space, since the connection of the window lifter rail drops into the region of the interface for receiving the speaker and hence no plastic door module surface which is required for other functional elements or can be used for the integration of the map holder rear wall is required. At the same time, a construction appropriate for the load is provided by means of a synergistic effect in the connection of the interfaces for connecting the window lifter rail and for receiving the speaker with reciprocal stiffening and therefore reinforcement of the interfaces.

On account of the window lifter rails which are provided on the map holder region in the case of the known plastic door module, the injection points for this module are likewise situated in the map holder region. By contrast, the invention permits the injection points to be displaced into the region of the speaker, with the result that the plastic door module according to the invention forms an undisturbed design surface in the region of the map holder rear wall and can therefore also serve as part of an inside door lining (partial inside lining).

The interface for connecting the window lifter rail is preferably connected to the interface for receiving the speaker in a region which is arranged in the direction of the vehicle transverse axis behind that surface of the plastic door module which faces an inside door lining of the motor vehicle door, so that, by means of the integration of the two interfaces, there is provided around the speaker a stiffer door module region which both increases the mechanical load-bearing capacity of the window lifter rail connection and ensures better speaker acoustics by the mounting being additionally stiffened.

An advantageous refinement of the invention is distinguished in that the interface for connecting the window lifter rail is connected to a speaker sealing surface for receiving the speaker frame.

The connection of the window lifter rail connection to the sealing surface for receiving the speaker frame permits a good material distribution for the reciprocal stiffening of the connection of the window lifter rail and of the receptacle of the speaker frame and therefore permits optimum load-bearing capacity and acoustics. At the same time, a simple sealing of the speaker region and therefore the protection thereof against moisture are obtained.

By means of an additional reinforcement of the plastic door module at least in the region of the interface for connecting the window lifter rail or stiffening of the interface for receiving the speaker, in particular the speaker sealing surface for receiving the speaker frame, and by increasing the material thickness of the plastic door module behind the interface for receiving the speaker, the available construction space is used optimally with an overall smaller construction depth and is oriented to the structural characteristics of the window lifter rail connection and of the speaker receptacle by cavities or regions remaining between the window lifter rail connection and the speaker being used for accumulation of the material of the plastic door module.

The interface for connecting the window lifter rail is preferably connected to the interface for receiving the speaker via a star- and/or tripod-shaped geometrical structure.

In a further refinement of the solution according to the invention, an injection point for the plastic door module, which is produced by a plastic injection molding technique, is provided in the geometrical structure and/or the connection of the interface for receiving the speaker to the interface for connecting the window lifter rail.

By utilizing the geometry of the connection of the interface for receiving the speaker to the interface for connecting the window lifter rail in order to position an injection point, a cold distributor for the plastic door module produced by an injection molding technique can be omitted and, accordingly, the outlay on finishing for the production of the plastic door module can be reduced.

To further optimize the production, a drip grid is integrated into the interface for receiving the speaker and can be injected onto the plastic door module via the injection point. A drip grid for the speaker can thereby be integrated into the plastic door module without additional injection points being required for the drip grid, with a small construction depth being ensured at the same time.

In a further embodiment, the interface of the plastic door module for connecting the window lifter rail has a stud fixing the window lifter rail in the direction of the vehicle longitudinal axis and the vehicle vertical axis, and a threaded hole into which a fastening means which can be inserted through the window lifter rail, in particular a fastening screw, can be screwed from the wet space side of the plastic door module in order to fix the window lifter rail in the direction of the vehicle transverse axis.

By means of this configuration of the interface, the window lifter rail is connected in a simple manner to the interface of the plastic door module via the stud and is fixed in the direction of the vehicle longitudinal axis and the vehicle vertical axis while only a fixing of the window lifter rail in the direction of the vehicle transverse axis takes place via the threaded hole and most of the load falls onto the connection of the stud with a corresponding recess of the window lifter rail. At the same time, the stud and/or the threaded hole can be used as an injection point for the mold of the plastic door module, so that, in order to fill the injection mold for the plastic door module, the connection of the interface for connecting the window lifter rail to the interface for receiving the speaker can take place in the region of the speaker receptacle via the interface for connecting the guide rails, which interface is arranged in this region.

As a further interface of the connection of the speaker to the plastic door module, a fastening for the speaker magnet can be provided, so that, for example, the speaker frame takes place via the corresponding interface, which is embossed on the surface of the plastic door module and, if appropriate, is stiffened, and via the fastening of the speaker magnet.

Furthermore, the interface which is designed as a fastening for the speaker magnet and is intended for receiving the speaker can contain the threaded hole for connecting the window lifter rail in the direction of the vehicle transverse axis, and the fastening means for fixing the window lifter rail in the direction of the vehicle transverse axis can be connected to the speaker magnet.

To further optimize the utilization of the construction space and, in particular, in order to reduce the construction depth while simultaneously isolating the speaker magnet from a metallic guide rail, a spacer element which is arranged between the speaker and the guide rail can be injected onto the plastic door module, so that there is no reciprocal electromagnetic effect and natural vibrations can be prevented.

The spacer element is preferably deployed from the surface of the plastic door module, bears against the rear side of the speaker magnet and comprises a spacer spring ring which is spring-elastic in the direction of the vehicle transverse axis, or a spacer spring.

A further advantageous refinement of the invention is distinguished in that a cable clip is injected on the wet space side of the plastic door module in the region behind the interface for receiving the speaker sealing surface, which cable clip, in particular, receives a cable harness which is laid between a bush for leading from the dry space side through to the wet space side of the plastic door module and a door separating point.

The arrangement of a cable clip on the wet space side of the plastic door module makes it possible to integrate a clip without additional outlay into a die for producing the plastic door module in the speaker region, since the opening for the speaker is sealed by the speaker itself and, as a result of the size of the speaker opening, the region behind the speaker is readily accessible. By means of the arrangement of the cable clip, the cable harness is protected against contact with the window, against rattling or damage by the moving window without a complicated fixing of additional cable clips to the plastic door module being required.

In order also to protect the cabling in the case of speakers with contact to the wet space, according to a further feature of the invention further cable clips can be provided on the wet space side of the plastic door module, which is associated with a considerable saving on costs on account of the lower outlay involved in taking the cable clips into consideration in the mold and, in addition, permits installation to take place from the dry space.

Furthermore, a plurality of openings arranged on the edge of the plastic door module or clips on holding elements for receiving functional elements which are to be connected to the plastic door module, which clips are intended for receiving a cable, Bowden cable or flexible or rigid components and functional elements, can be provided.

BRIEF DESCRIPTION OF THE DRAWINGS

Further features and advantages of the invention are to be explained with reference to a plurality of exemplary embodiments illustrated in the figures, in which.

DETAILED DESCRIPTION

Figure 1:
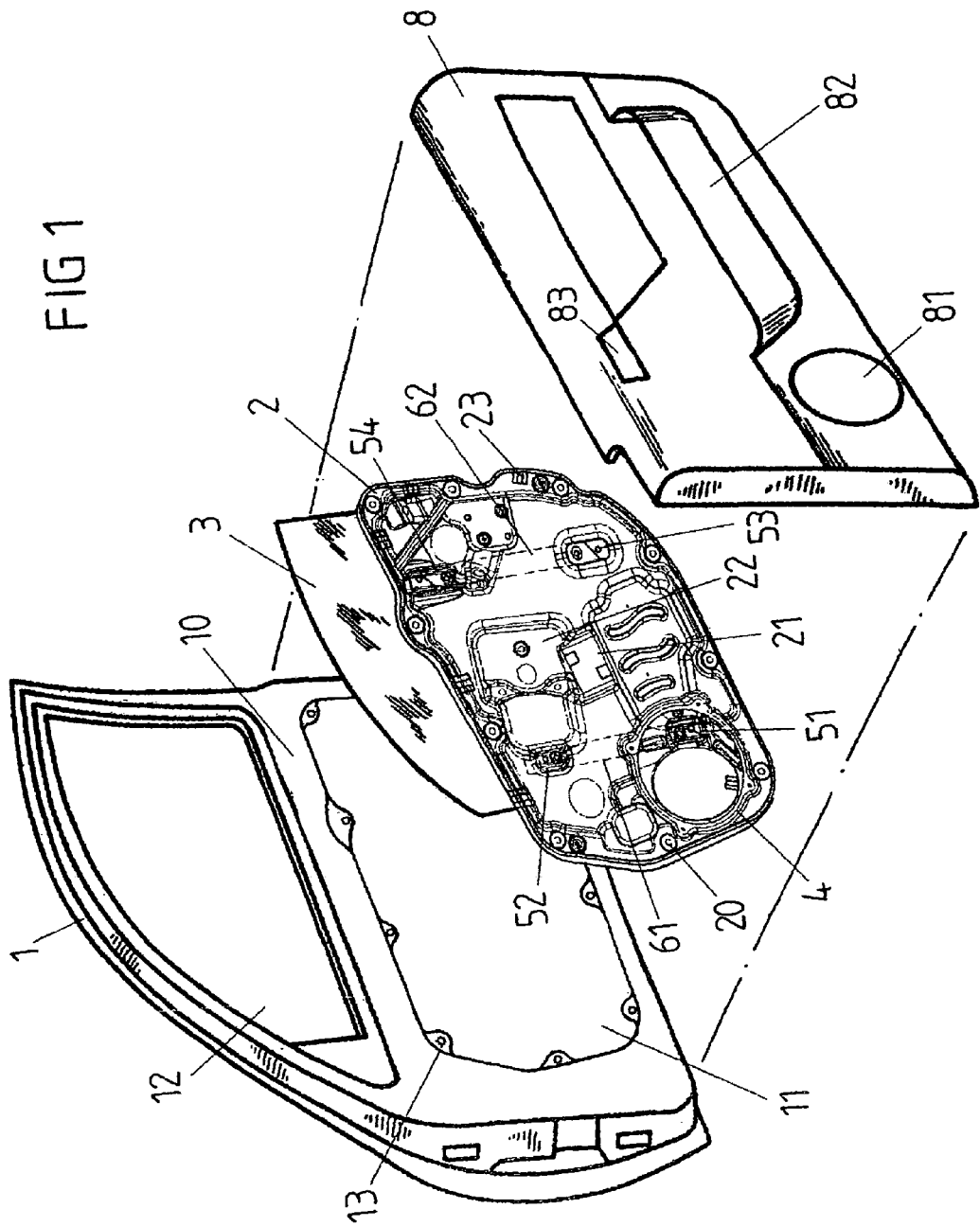
FIG. 1 shows a schematically perspective exploded illustration of a motor vehicle door with a plastic door module.

FIG. 1 shows, in a schematically perspective exploded illustration, a door body of a motor vehicle door 1 which is composed of an inside door panel and an outer paneling or an outside door panel and, below a door breastwork 10, a door cutout 11 in the inside door panel and, above the door breastwork 10, a window opening 12 which can be closed by a displaceable window 3. On its periphery, the door cutout 11 has a plurality of distributed module receptacles 13 for a plastic door module 2, the contour of which essentially corresponds to the contour of the door cutout 11.

The plastic door module 2 contains fastening points 20 corresponding to the module receptacles 13 of the motor vehicle door 1 in order to connect the plastic door module 2 to the door body of the motor vehicle door 1, so that, in the fitted state, the plastic door module 2 covers the door cutout 11 of the door body. The plastic door module 2 is bounded by an edge with an encircling groove into which a seal is placed, so that, in the fitted state of the plastic door module, the seal bears in a sealing manner against the edge of the opening of the door body and therefore brings about a moisture-tight partitioning off of the wet space side from the dry space side of the motor vehicle door 1.

The plastic door module 2 furthermore has distributed receiving elements 23 for fastening an inside door lining 8 to the plastic door module 2 and contains an interface 4 for receiving a speaker, interfaces 51 to 54 for connecting window lifter rails 61, 62 (illustrated by dashed lines) and openings 21 and plateau-like elevations 22 for further functional elements of the motor vehicle door 1, such as window lifter drive, door lock and the like.

The inside door lining 8 contains, inter alia, a speaker opening 81, a recess 83 for the insertion of an inside door handle and a map holder 82 which extends over a relatively large length of the inside door lining 8 and is at least partially molded into the inside door lining 8 in the direction of the vehicle transverse axis in order to ensure a sufficient depth without substantially protruding into the vehicle interior.

In the arrangement of the interfaces for connecting the window lifter rails 61, 62 for a window lifter for lifting and lowering a window 3 covering, in the lifted state, the window opening 12—or alternatively of the interfaces for an individual window lifter guide rail—there is the problem, in particular in the region of the lower connection of the front window lifter rail 61, that either a speaker is arranged there and accordingly additional holding brackets have to be provided for connecting the window lifter rail to the door module, or the length or depth of the map holder 82 arranged adjacent to the speaker has to be reduced.

Figure 2:
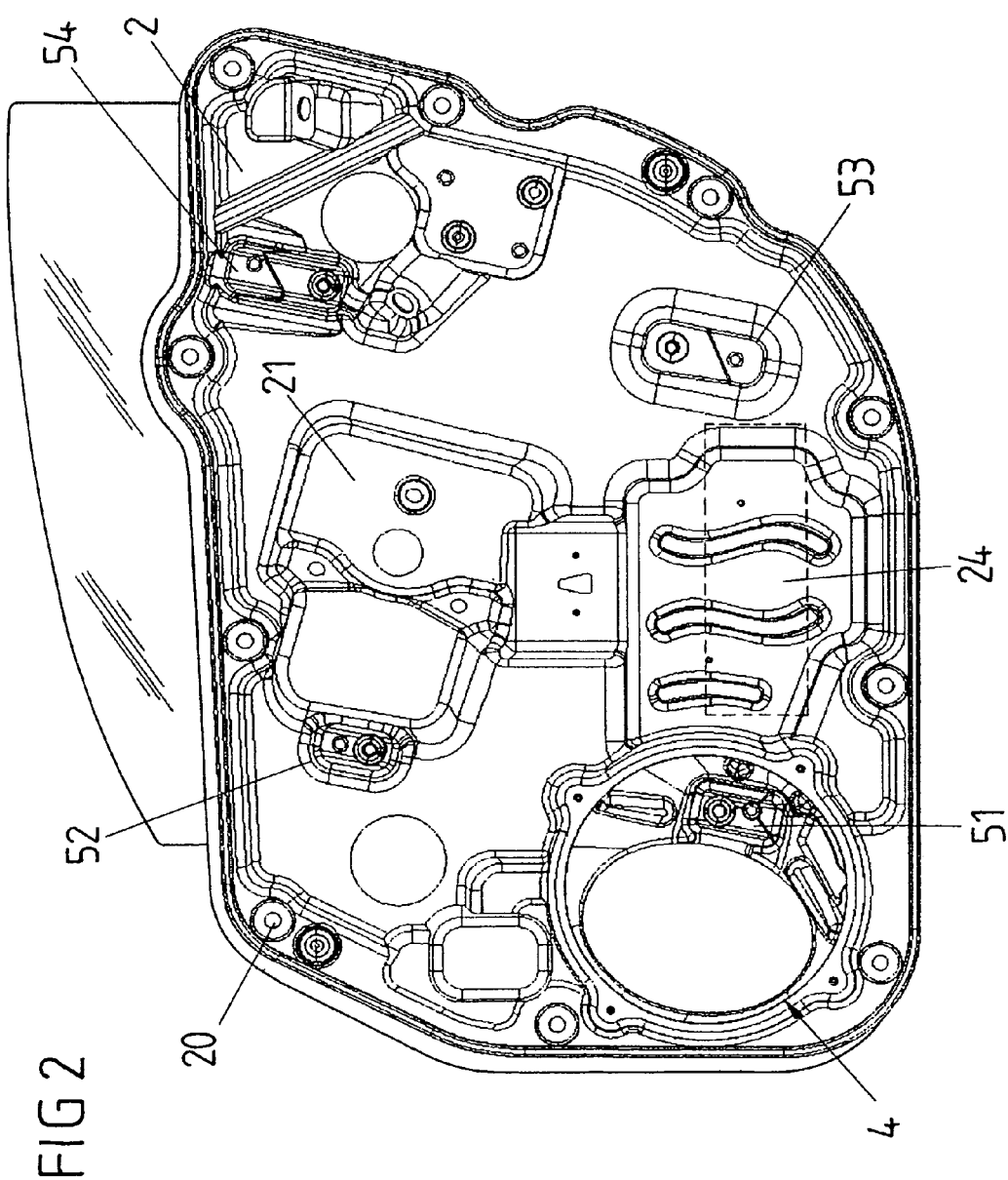
FIG. 2 shows an enlarged plan view of the plastic door module from the dry space side of the motor vehicle door.
Figure 3:
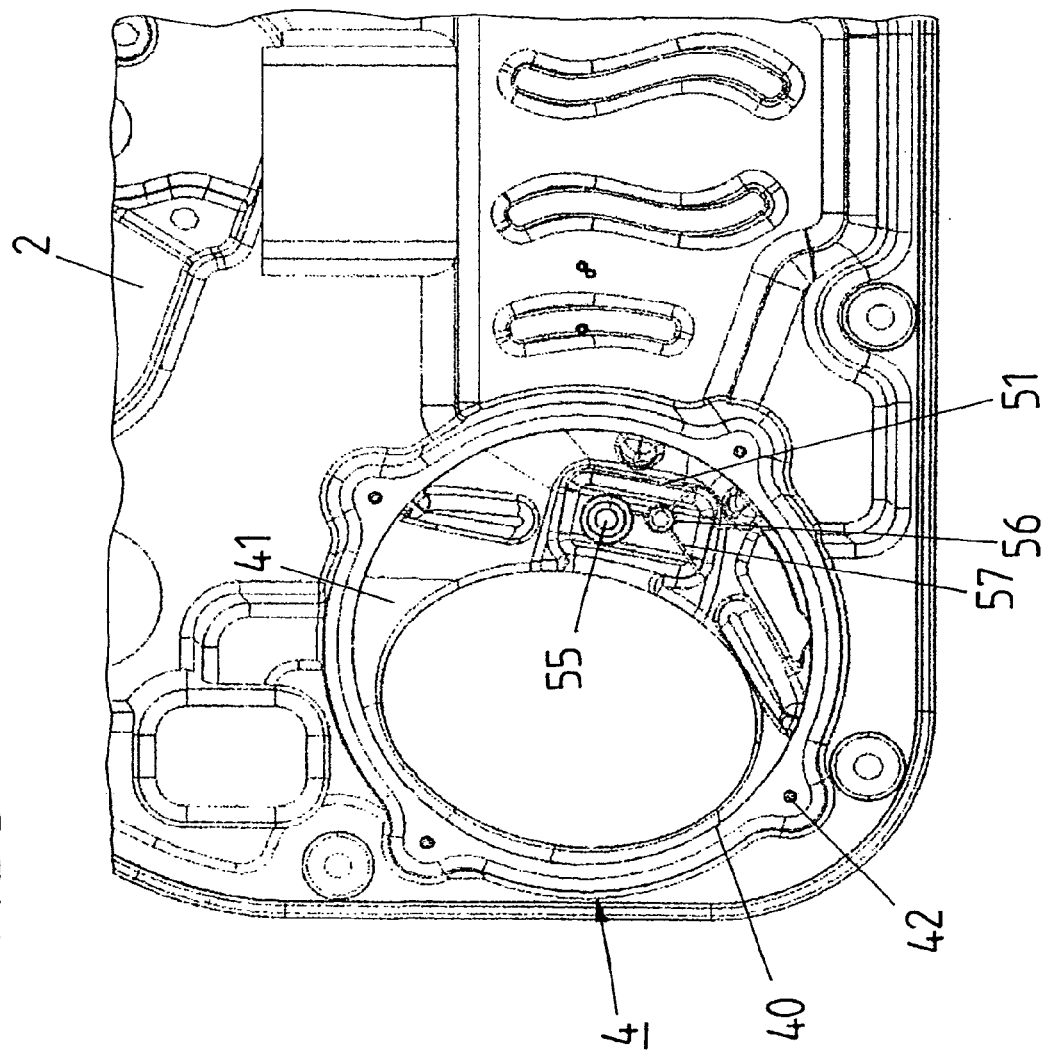
FIG. 3 shows an enlarged detailed view of the interfaces for a window lifter rail and a speaker.
Figure 4:
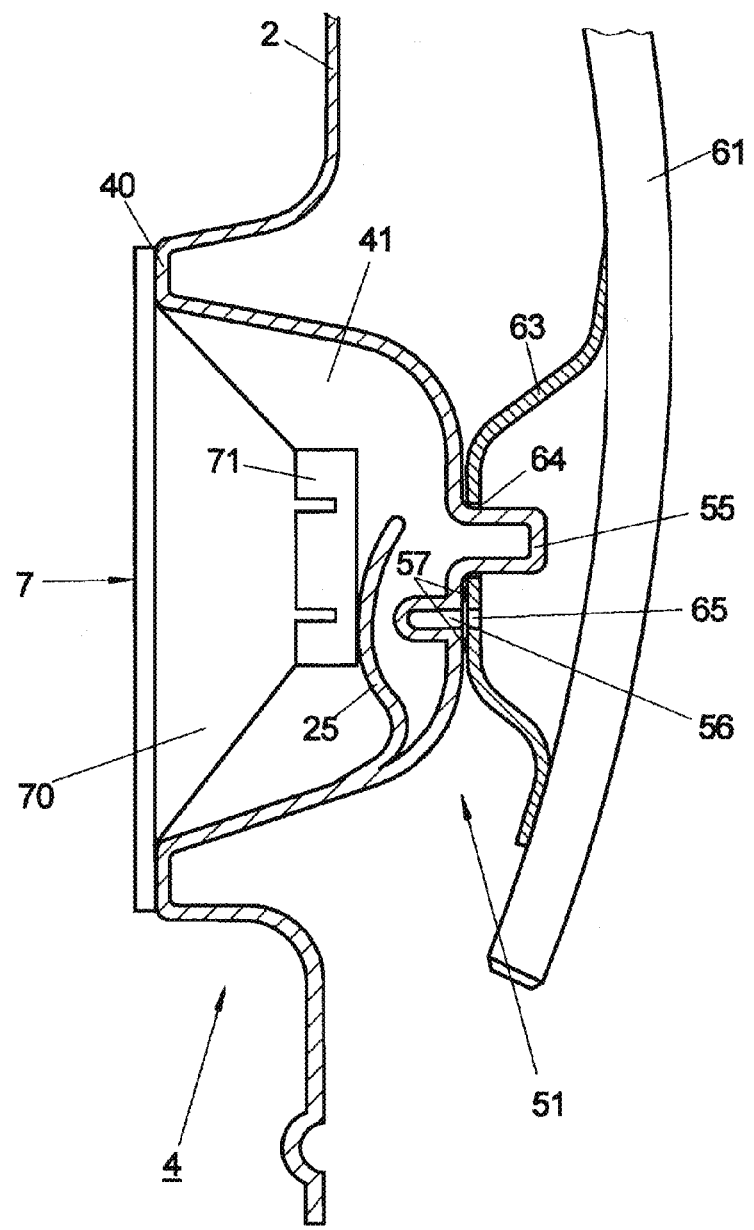
FIG. 4 shows a longitudinal section through the interfaces for a window lifter rail and a speaker according to FIG. 3.

As can be gathered from the plan view of the plastic door module 2 from the dry space side according to FIG. 2, the enlarged illustration of the region of the interface of the plastic door module for receiving a speaker 7 according to FIG. 3, and the longitudinal section, illustrated in FIG. 4, through the receptacle of the speaker 7, this problem is solved according to the invention by the interface 51 for connecting the window lifter rail 61 being connected to the interface 4 for receiving the speaker 7 or being integrated therein. The connection or integration takes place according to FIG. 3 in such a manner that the interface for connecting the window lifter rail 61 is arranged in the direction of the vehicle transverse axis behind the interface 4 of the speaker 7 or behind the receptacle 40 for the speaker frame 70 and is connected to said interface or receptacle or is integrated therein.

It can be gathered from the enlarged individual illustration of the region of the interface 4 for receiving the speaker according to FIG. 3 that the sealing surface 40, which protrudes from the surface of 30 the plastic door module 2 and is provided with four fastening regions 42 offset in each case by 90° with respect to one another for connection to the speaker frame 70 and is intended for receiving the outer edge of the speaker frame 70 is additionally reinforced by a corresponding accumulation of material and is therefore of thicker design than is required for receiving a speaker.

The interface 51 for connecting the lower end of the guide rail 61 according to FIG. 2 is connected via a star- or tripod-shaped geometrical structure 57 to the sturdy region of the interface 4 for receiving the speaker 7 and, according to the longitudinal section (illustrated in FIG. 4) through the interfaces 4, 51 for connecting the window lifter rail 61 and for receiving the speaker 7, has a stud 55 which protrudes to the wet space side from the interface 51 for connecting the window lifter rail 61, and a cylindrical threaded hole 56, which is designed as a blind hole, for connecting the window lifter rail 61.

The window lifter rail 61, for its part, has an interface 63 for connecting to the interface 51 of the plastic door module 2 with an insertion opening 64 and with a bore 65 for a fastening screw. The insertion opening 64 serves to receive the stud 55 and is matched in a form-fitting manner to the stud 55, so that the window lifter rail 61 is positioned on the interface 51 of the plastic door module 2 and can be fixed in the direction of the vehicle longitudinal axis or X-axis and in the direction of the vehicle vertical axis or Z-axis. A fastening screw which can be screwed through the threaded opening 65 into the blind hole-shaped threaded hole 56 serves to fix the window lifter rail 61 in the direction of the transverse vehicle axis or Y-axis.

The speaker frame 70 of the speaker 7 is fastened by its outer edge to the sealing surface 40 of the interface 4 by means of four fastening regions 42 offset by in each case 90° with respect to one another on the circumference of the sealing surface 40 for receiving the outer edge of the speaker frame 70 and protrudes into a depression 41 provided in the plastic door module 2, so that the speaker magnet 71 is placed at a small distance from the interface 51 for connecting the window lifter rail 61.

In order to ensure that the speaker 7 is not affected electromagnetically by the proximity of the speaker magnet 71 to a metallic window lifter rail 61, in the arrangement according to FIG. 4 a spacer spring 25 is provided which protrudes to the dry space side from the frame-shaped depression of the plastic door module 2 and bears against the rear side of the speaker magnet 71. The spacer spring 25 ensures a minimum distance between the speaker magnet 71 and the window lifter rail 61 and therefore ensures that the damping behavior or natural vibration behavior of the speaker 7 is not disadvantageously affected.

The effect achieved by integrating the interface 51 for connecting the window lifter rail 61 into the interface region for receiving the speaker 7 is that the connection of the window lifter rail 61 takes place outside the map holder region 24 (illustrated by dashed lines in FIG. 2), so that the rear wall of the map holder 82, which rear wall is deployed towards the plastic door module 2, obtains sufficient space in the inside door lining 8 and therefore optimum utilization of the construction space is ensured. In addition, for the integration of the interface 51 for connecting the window lifter rail 61 into the interface 4 for connecting the speaker 7, no additional outlay on production is required due to the arrangement of a cold distributor in conjunction with the injection mold for producing the plastic door module 2 and, accordingly, also no finishing is required in order to eliminate injection points, since the injection of the plastic material takes place directly via the injected region of the interfaces 4, 51, in particular via the receiving elements, which are arranged in this region, in the form of the stud 55 and/or of the cylindrical threaded hole 56, which is designed as a blind hole, for connecting the window lifter rail 61. Furthermore, there is the possibility of integrating, likewise without additional injection points, a drip grid for the speaker 7 on the wet space side of the plastic door module 2 into the interface 4 for receiving the speaker 7.

Furthermore, by integrating the interface 51 for connecting the window lifter rail 61 into the interface 4 for receiving the speaker 7, use is made of the customarily high stiffness of the interface 4 for receiving the speaker 7 and, at the same time, a reciprocal stiffening of the interfaces 4, 51 is achieved by their connection.

In an alternative embodiment, the speaker magnets 71 or the speaker frame 70 of the speaker 7 can be screwed down through the window lifter rail 61 and can thereby be connected to the plastic door module 2. This results in the possibility of reducing the material thickness of the plastic door module 2 in the region of the speaker 7, since adequate stiffness has to be obtained only in the region of the interface 51 for connecting the window lifter rail 61, and the window lifter rail 61 transmits the forces acting on it to the plastic door module 2 over a relatively large area.

Figure 5:
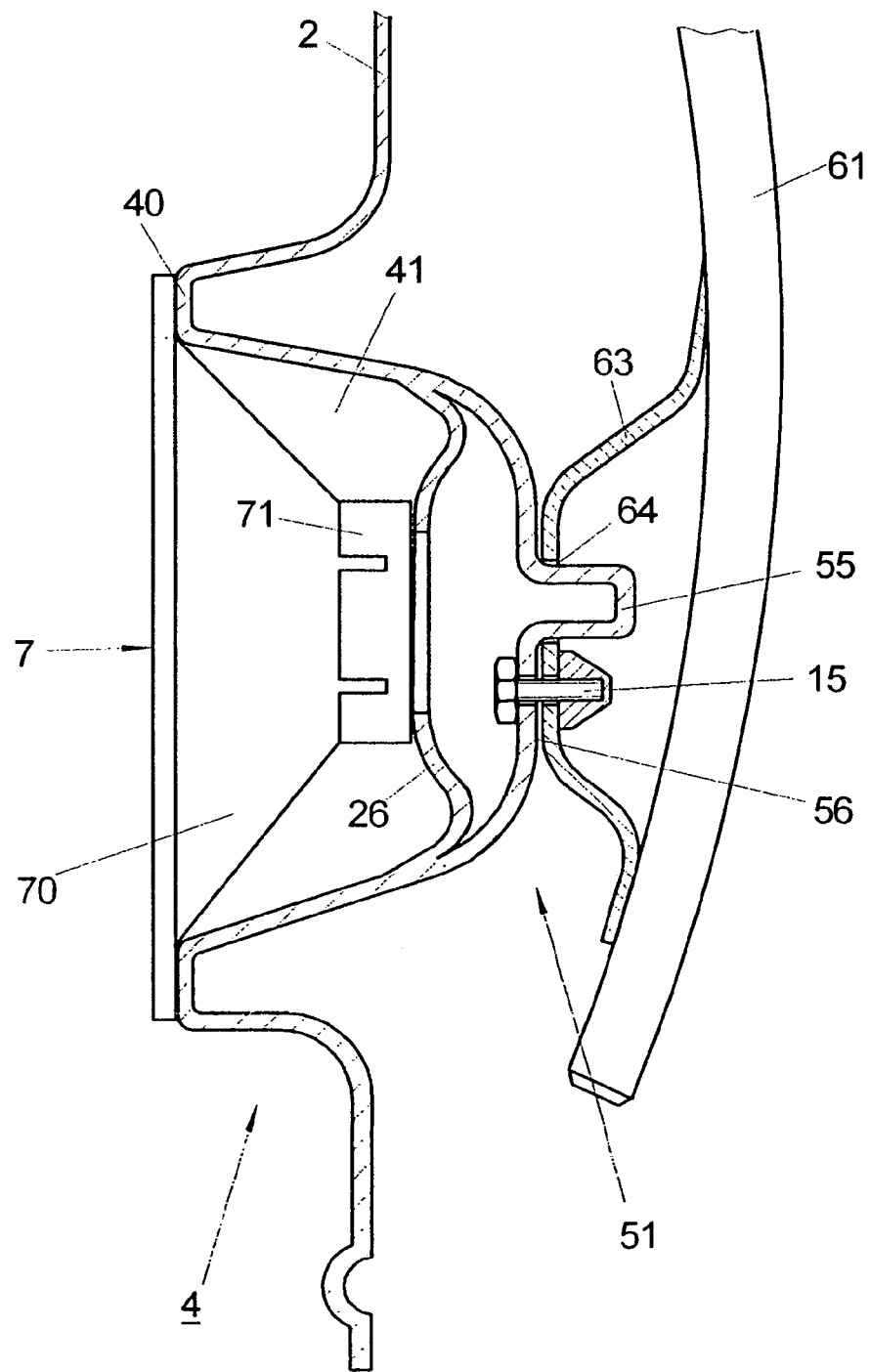
FIG. 5 shows a longitudinal section through a second embodiment of the interfaces for a window lifter rail and a speaker.

FIG. 5 illustrates a schematic longitudinal section through the interfaces 4 and 51 for connecting the window lifter rail 61 and receiving the speaker 7, in which longitudinal section the window lifter rail 61 is fixed in the direction of the vehicle transverse axis via a fastening screw 15 inserted through the interface 51 from the dry space side. This type of fastening has the advantage that the connection of the window lifter rail 61 can take place from the dry space side through the speaker opening in the plastic door module 2. In this embodiment illustrated in FIG. 5, in addition, instead of a spacer spring, a spacer spring ring 26 is provided which protrudes from the wall of the plastic door module 2 from the depression 41 of the interface 4 for receiving the speaker 7 and, in the fitted state of the speaker 7, bears against the rear side of the speaker magnet 71.

The design of a spacer element in the form of a spacer spring 25 according to FIG. 4 or a spacer spring ring 26 according to FIG. 5 provides the possibility of minimizing the construction depth in the direction of the vehicle transverse axis or Y-axis without an electromagnetic interaction occurring between the speaker magnet 71 and the window lifter rail 61.

Figure 8:
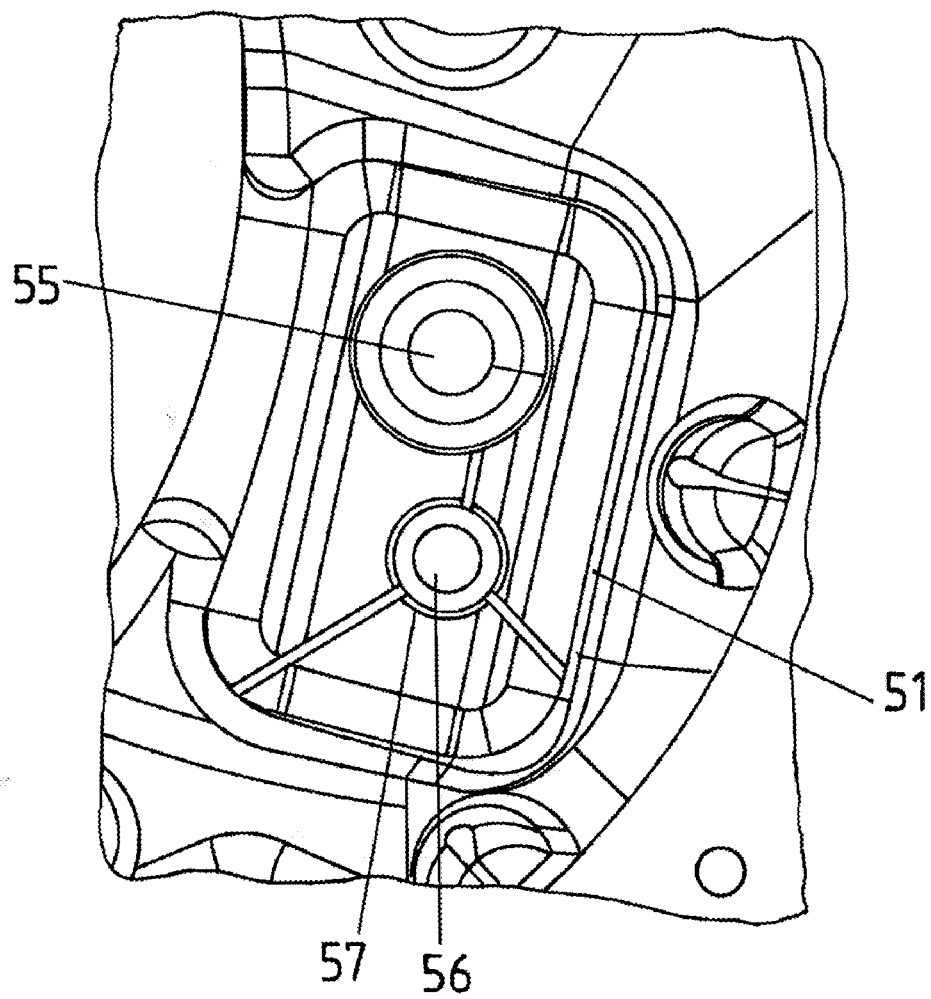
FIG. 8 shows another enlarged detailed view of the interfaces for a window lifter rail and a speaker.

FIG. 8 shows an enlarged front detail view of the interface 51 from the wet side and shows the stud 55, the cylindrical bore 56, and the tripod-shaped geometric structure 57.

Figure 6:
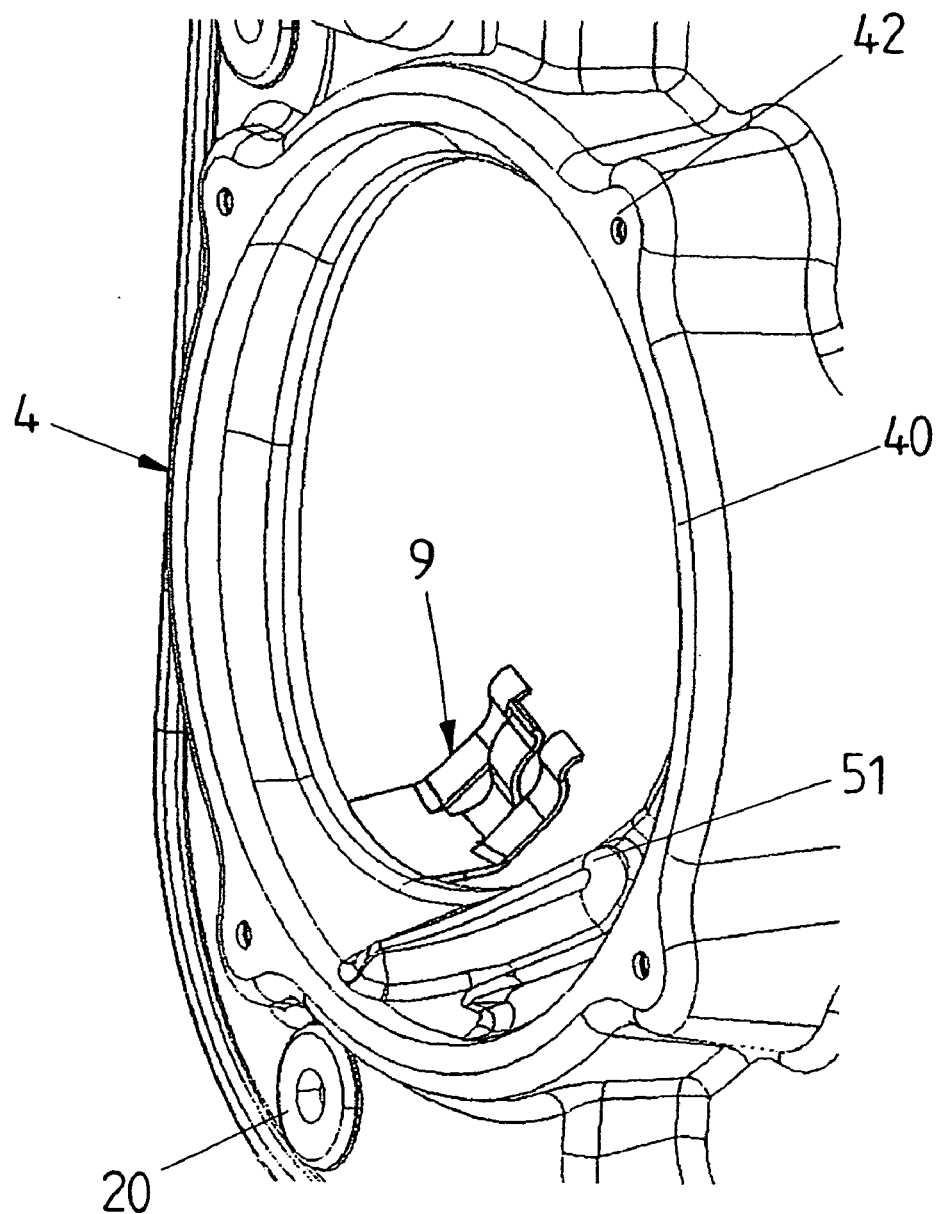
FIG. 6 shows a perspective illustration of the connection of a cable clip to the interface for receiving a speaker.
Figure 7:
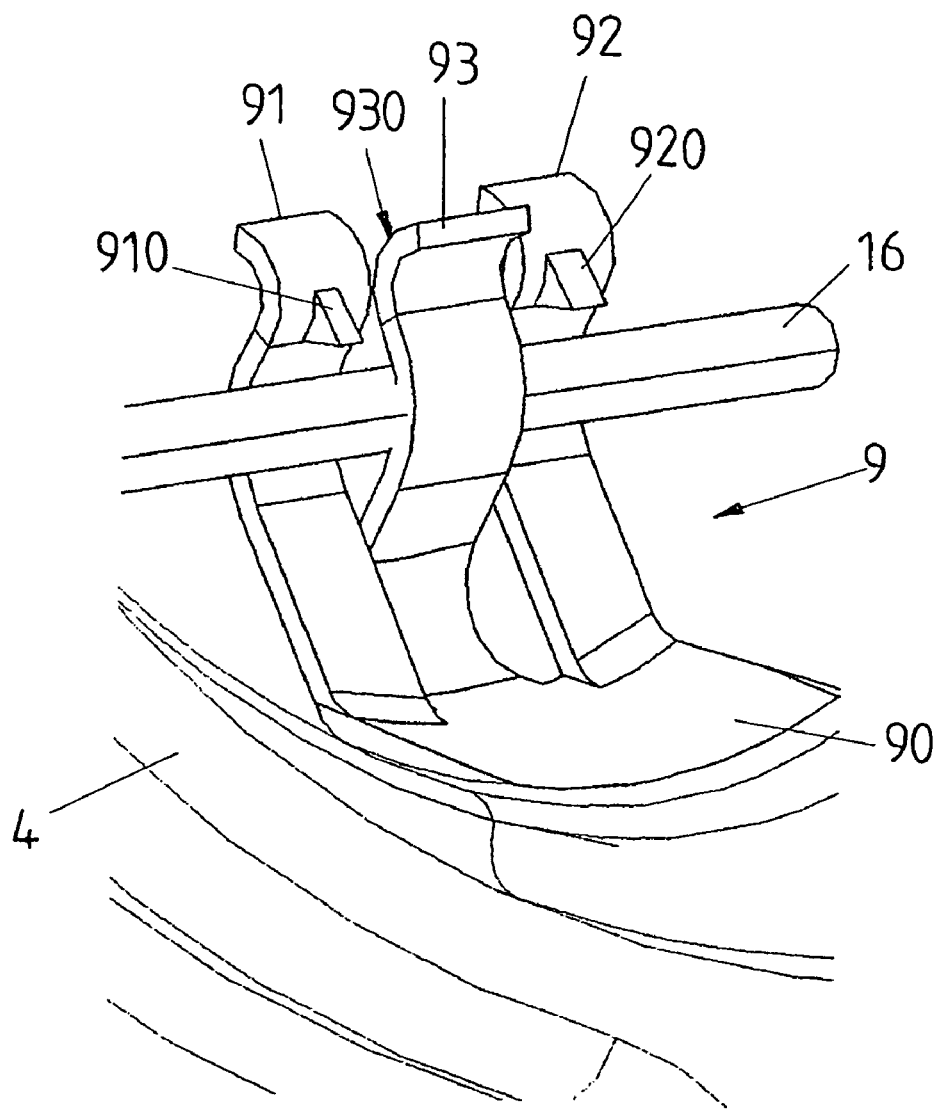
FIG. 7 shows an enlarged illustration of the cable clip according to FIG. 6 with the cable harness inserted.

FIG. 6 shows, in a perspective view, the interface 4 for receiving a speaker, into which a cable clip 9 for receiving a speaker cable or cable harness 16 according to FIG. 7 is integrated behind the speaker sealing surface 40. In order to lay the cable harness 16 from the dry space side of the plastic door module 2 to the door separating point of the motor vehicle door 1 according to FIG. 1, a bush with a wet/dry space separation is usually provided in the region of the interface 4 for receiving the speaker. However, since the window lifter rail 61 is also arranged in this region, there may be contact of the cable harness 16 with the window, or there may be rattling noises or damage to the cable harness 16 by the moving window, with the result that, in previous embodiments of door modules, either separate clips are provided and are connected to the door module, or a very stiff bush is used for the leadthrough in the speaker region.

The integration according to the invention of a cable clip 9 into the interface 4 for receiving a speaker makes it possible for the cable clip 9 to be integrated without additional outlay in the die for producing the plastic door module 2, since the speaker hole of the interface 4 for receiving a speaker is sealed by the speaker itself and this region is readily accessible through the speaker hole before the speaker is installed.

The cable clip 9, which is illustrated in enlarged form in FIG. 7, comprises a plurality of tongues 91, 92, 93 which lead out from a base surface 90 and are positioned with respect to one another and shaped in such a manner that the cable harness 16 is introduced in a simple manner into the cable clip 9 and is securely positioned therein by the mutual alignment of the tongues 91, 92, on the one hand, and the tongue 93, on the other hand, and by the arrangement of introducing and blocking slopes 910, 920, 930 on the tongues 91, 92, 93.

The shaping of the tongues 91, 92, 93 permits a simple injection of the cable clip 9 onto the interface 4 for receiving the speaker without the arrangement of what is referred to as a "slide" during the filling of an injection mold for the plastic door module and instead permits the use of a simple opening and closing die.

In a development of the embodiment of a cable clip 9 that is illustrated in FIGS. 6 and 7, further cable clips can also be provided in order to protect the cabling in the case of speakers with contact to a wet space. Furthermore, the geometry provided by the arrangement of the cable clip 9 can be used in order to position an injection point or to stiffen the speaker sealing surface 40.

A further embodiment of the invention provides a plurality of clips 23 which are distributed on the edge or on openings or holding elements of the plastic door module 2 according to FIGS. 1 and 2 and are intended for receiving a cable, Bowden cable, or flexible or rigid components. For example, these additional clips can be integrated into the receptacles for attaching the inside door lining 8, with the result that, firstly, a secure guidance of the cable, Bowden cable or component is ensured and, secondly, a secure connection takes place between the plastic door module 2 and the inside door lining 8.

The invention claimed is:

1. A plastic door module for a motor vehicle door comprising a first interface connecting a window lifter rail to the door module and a second interface receiving a speaker, the second interface comprising a speaker depression formed in the plastic door module and a speaker fastening edge surrounding a speaker opening formed in the plastic door module, the speaker fastener edge comprising fastening regions for receiving fasteners to fasten the speaker to the plastic door module, wherein the first interface is formed by a portion of the speaker depression, and wherein the speaker depression and said portion are arranged such that when viewed along a vehicle transverse axis, the speaker depression, said speaker opening, and said portion at least partially overlap.

2. The plastic door module of claim 1, wherein the first interface is connected to the second interface in a region arranged in a direction of the vehicle transverse axis behind a surface facing an inside door lining.

3. The plastic door module of claim 1 or 2, wherein the first interface is connected to a speaker sealing surface for receiving a frame of the speaker.

4. The plastic door module of claim 1, wherein at least the region of the first interface is reinforced.

5. The plastic door module of claim 1, wherein the second interface is stiffened.

6. The plastic door module of claim 4, comprising increased material thickness behind the second interface.

7. The plastic door module of claim 1, wherein the first interface is connected to the second interface via a geometrical structure.

8. The plastic door module of claim 1, wherein the plastic door module is produced by a plastic injection molding technique, and wherein an injection point is provided in a region of connection between the second interface and the first interface.

9. The plastic door module of claim 1, wherein the first interface comprises a stud fixing the window lifter rail in a direction of the vehicle longitudinal axis and a vehicle vertical axis, the first interface further comprising a threaded hole into which a fastener is insertable through the window lifter rail, wherein the fastener is configured to be fastened from a wet space side in order to fix the window lifter rail in the direction of a vehicle transverse axis.

10. The plastic door module of claim 9, wherein at least one of the stud and the threaded hole is configured as an injection point.

11. The plastic door module of claim 1, wherein a fastening device for a speaker magnet is configured as the second interface.

12. The plastic door module of claim 11, wherein the fastening device for the speaker magnet contains a threaded hole for connecting the window lifter rail in a direction of the vehicle transverse axis, and wherein a fastener for fixing the window lifter rail in the direction of the vehicle transverse axis is connected to the speaker magnet.

13. The plastic door module of claim 1, further comprising an injected spacer element arranged between the speaker and the window lifter rail.

14. The plastic door module of claim 13, wherein the spacer element is deployed from a surface and bears against a rear side of a speaker magnet.

15. The plastic door module of claim 13, wherein the spacer element is configured as a spacer spring being spring-elastic in a direction of the vehicle transverse axis.

16. The plastic door module of claim 1, wherein a cable clip is injected on a wet space side in a region behind the fastening edge.

17. The plastic door module of claim 16, wherein the cable clip is configured as an injection point.

18. The plastic door module of claim 16, wherein the cable clip receives at least one of a speaker cable and a cable harness laid between a bush for leading from a dry space side through to the wet space side and a door separating point.

19. The plastic door module of claim 16, wherein the cable clip receives a cable contacting the speaker on the wet space side.

20. The plastic door module of claim 1, further comprising a plurality of injected clips distributed on an edge for receiving one of a cable, a Bowden cable, flexible components and rigid components.

21. The plastic door module of claim 1, further comprising clips arranged on edges of openings for receiving one of a cable, a Bowden cable, flexible components and rigid components.

22. The plastic door module of claim 1, further comprising clips integrated into holding elements for receiving components comprising one of a cable, a Bowden cable, flexible components and rigid components.

23. The plastic door module of claim 5, wherein the first interface is connected to a speaker sealing surface for receiving a frame of the speaker, and wherein the speaker sealing surface is stiffened.

24. The plastic door module of claim 7, wherein the geometrical structure is at least one of star-shaped and tripod-shaped.

25. The plastic door module of claim 9, wherein the fastener is a screw configured to be screwed into the threaded hole.

26. The plastic door module of claim 15, wherein the spacer element is configured as a spacer spring ring.

27. The plastic door module of claim 7 wherein the plastic door module is produced by a plastic injection molding technique, and wherein an injection point is provided in at least one of the geometrical structure and a region of connection between the second interface and the first interface.

28. The plastic door module of claim 1 wherein when a window rail lifter is connected to the door module, the first interface is arranged between the window rail and the second interface.

29. A plastic door module for a motor vehicle door comprising:
   a first interface connecting a window lifter rail to the door module;
   a second interface receiving a speaker, wherein the first interface is connected to the second interface, wherein the second interface comprises a speaker depression formed in the plastic door module and a speaker fastener edge surrounding a speaker hole formed in the plastic door module, the speaker fastening edge comprising fastening regions for receiving fasteners to fasten the speaker to the plastic door module, and wherein the first interface is formed by a portion of the speaker depression; and
   wherein the plastic door module is produced by a plastic injection molding technique, and wherein an injection point is provided in at least one of a geometrical structure connecting the window lifter rail to the second interface and in a region of connection between the second interface and the first interface.

30. The plastic door module of claim 1, wherein the portion of the door module forming the first interface comprises a depression provided in the door module.

* * * * *

UNITED STATES PATENT AND TRADEMARK OFFICE
CERTIFICATE OF CORRECTION

PATENT NO.      : 7,913,455 B2
APPLICATION NO. : 11/520495
DATED           : March 29, 2011
INVENTOR(S)     : Harald Kruger et al.

Page 1 of 1

It is certified that error appears in the above-identified patent and that said Letters Patent is hereby corrected as shown below:

In the Claims

Column 8, Claim 1, line 35          Delete "fastener"
                                    Insert -- fastening --

Column 10, Claim 27, line 15        After "claim 7"
                                    insert -- , --

Signed and Sealed this
Twenty-second Day of November, 2011

David J. Kappos
*Director of the United States Patent and Trademark Office*